United States Patent [19]

McDaniel

[11] 4,294,724

[45] Oct. 13, 1981

[54] TITANIUM IMPREGNATED SILICA-CHROMIUM CATALYSTS

[75] Inventor: Max P. McDaniel, Bartlesville, Okla.

[73] Assignee: Phillips Petroleum Company, Bartlesville, Okla.

[21] Appl. No.: 118,893

[22] Filed: Feb. 6, 1980

[51] Int. Cl.³ .................. B01J 21/08; B01J 23/26; B01J 21/00

[52] U.S. Cl. ................... 252/451; 252/458; 526/106

[58] Field of Search ............ 252/451, 458; 526/106; 423/338

[56] References Cited

U.S. PATENT DOCUMENTS

| | | | |
|---|---|---|---|
| 2,503,913 | 4/1950 | Kimberlin, Jr. et al. | 34/9 |
| 3,882,096 | 5/1975 | Shida et al. | 252/430 X |
| 3,887,494 | 6/1975 | Dietz | 252/452 |
| 4,041,224 | 8/1977 | Hoff et al. | 526/106 X |
| 4,053,436 | 10/1977 | Hogan et al. | 252/452 |
| 4,119,569 | 10/1978 | Dietz | 252/452 |
| 4,169,926 | 10/1979 | McDaniel | 526/106 |
| 4,190,457 | 2/1980 | McDaniel | 423/338 X |
| 4,218,345 | 8/1980 | Hoff et al. | 252/458 |

*Primary Examiner*—Carl F. Dees

[57] ABSTRACT

In accordance with one embodiment of this invention, a silica hydrogel is prepared and dried in the presence of a pore preserving agent after which a titanium compound is anhydrously incorporated therewith. In accordance with the second embodiment of this invention, a silica hydrogel or a silica xerogel is impregnated with an aqueous organic acid solution of a substituted or unsubstituted titanium acetylacetonate. The invention allows the use of conventional drying to produce a silica exhibiting characteristics associated with azeotrope dried titanium-silica for use as a support for chromium catalysts. The resulting catalysts are broadly applicable in the polymerization of olefins and are of particular utility in the slurry polymerization of olefins, particularly predominantly ethylene monomer.

28 Claims, No Drawings

TITANIUM IMPREGNATED SILICA-CHROMIUM CATALYSTS

BACKGROUND OF THE INVENTION

This invention relates to silica supported chromium catalysts containing titanium.

Supported chromium oxide catalysts have been used for many years in the polymerization of olefins to solid polymers. One widely used method of producing such catalysts involves precipitating a silica hydrogel, impregnating the hydrogel with an aqueous solution of a chromium compound and drying. Such procedure gives a silica which inherently has sufficient strength to resist severe shrinkage of the pores during simple drying techniques such as oven drying, tray drying, spray drying or drying under a heat lamp. Such catalyst is simple and inexpensive to produce and gives outstanding results in solution polymerization of olefins to give normally solid polymer.

There is an economic advantage in some instances to producing olefin polymers in a slurry as opposed to a solution system. However, certain control operations which are easily carried out in the solution process are considerably more difficult in the particle-form or slurry process. For instance in the solution process, control of the molecular weight can be effected by changing the temperature, with lower molecular weight (higher melt flow) being obtained at the higher temperature. However, in the slurry process, this technique is inherently limited since any effort to increase the melt flow to any appreciable extent by increasing the temperature causes the polymer to go into solution and thus destroys the slurry process.

It is known that titanium affects the polymerization activity of silica supported chromium catalysts in a way that is of special importance in slurry polymerizations. However, when titanium is coprecipitated with the silica, it produces a hydrogel which does not have sufficient strength to resist serious collapse of the pores during simple drying such as spray drying. Similarly, in accordance with the prior art, if an aqueous solution of a titanium compound is added to the dried silica, the pores are damaged. Accordingly, in order to take full advantage of the improvement which can be imparted to the melt index capability through the use of titanium in accordance with the prior art, the titanium had to be coprecipitated with the silica and the resulting hydrogel (cogel) dried by a more expensive azeotrope distillation or washing with a liquid oxygen-containing water soluble organic compound.

SUMMARY OF THE INVENTION

It is an object of this invention to provide a titanium-containing silica supported chromium catalyst which can be dried in a conventional manner and yet which exhibits the characteristics associated with azeotrope dried titanium-silica coprecipitated catalysts.

It is a further object of this invention to provide a catalyst suitable for use in slurry polymerization systems; and It is yet a further object of this invention to provide an improved olefin polymerization process.

There are two embodiments to this invention. In accordance with the first embodiment, silica hydrogel is prepared and dried in the presence of a pore preserving agent after which a titanium compound is anhydrously incorporated therewith.

In accordance with the second embodiment of this invention, a silica hydrogel or a silica xerogel is impregnated with an aqueous organic acid solution of a substituted or unsubstituted titanium acetylacetonate.

DESCRIPTION OF THE PREFERRED EMBODIMENTS

Embodiment 1

In accordance with embodiment 1, a silica hydrogel containing a pore preserving agent is dried and thereafter the titanium compound is introduced in an anhydrous manner. The silica hydrogel can be prepared in a conventional manner, for instance, by contacting an aqueous acid solution with an aqueous solution of an alkali metal silicate as disclosed in Witt, U.S. Pat. No. 3,900,457, issued Aug. 19, 1975, the disclosure of which is hereby incorporated by reference. Preferably, the alkali metal silicate is added to the acid.

Prior to drying, the hydrogel must contain a pore preserving agent. The silica pore structure preserving agents can be selected from among organic silicon compounds, e.g., triarylsilanols, described in application Ser. No. 914,258, filed June 9, 1978 now U.S. Pat. No. 4,190,457, the disclosure of which is hereby incorporated by reference; oxygen-containing organic compounds selected from among polyhydric alcohols, mono- and dialkyl ethers of ethylene glycol and poly(alkylene)glycol as disclosed in McDaniel, U.S. Pat. No. 4,169,926, issued Oct. 2, 1979, the disclosure of which is hereby incorporated by reference and surfactants. U.S. Pat. No. 4,169,926 also discloses suitable anionic, cationic and nonionic surfactants. This patent also discloses combinations of the oxygen-containing organic compounds with a normally liquid hydrocarbon, e.g., n-heptane, kerosene, and, optionally, a surfactant, which are also suitable pore preserving agents. The nonionic surfactants are preferred.

Said organic silicon compounds have the structure

wherein n is an integer of 2 or 3, and wherein each R is a saturated or unsaturated hydrocarbon group wherein each R can be the same or different and wherein A is selected from the group consisting of hydroxy radicals, halides and alkoxy radicals in which the alkyl group therein contains from 1 to about 10 carbon atoms.

Preferably, R is selected from the group consisting of alkyl radicals of from 4 to about 12 carbon atoms, alicyclic radicals of from 4 to about 12 carbon atoms, aryl radicals of from 6 to about 24 carbon atoms, and hydrocarbyl-substituted aryl radicals such as alkylaryl and cycloalkylaryl of from 6 to about 24 carbon atoms.

The pore preserving agents can also include certain inorganic and organic acids used at a specific level of pH. Specifically the hydrogel is contacted with an inorganic or organic acid in an amount sufficient to impart to the mixture a pH ranging generally from about 0 to about 3.5, more specifically from about 0 to 3. About 2.2 or below is presently believed to be preferred.

Inorganic acids employable are those which are water soluble, sufficiently ionized to produce the pH level required in the hydrogels, and do not have a deleterious effect on the silica or in the end use application. Specific but nonlimiting acids can be selected from among hydrochloric acid, hydrobromic acid, hydriodic acid, nitric acid, sulfamic acid, sulfuric acid, orthophosphoric acid and iodic acid.

Organic acids generally employable in this invention are those which exhibit the same requirements as the inorganic acids. Specific but nonlimiting examples include acetic acid, formic acid, tartaric acid, citric acid, maleic acid, malic acid, malonic acid, succinic acid, gluconic acid, diglycolic acid, ascorbic acid, cyclopentane tetracarboxylic acid, and benzenesulfonic acid.

In general, those organic acids meeting the requirements of water solubility, stability, acid strength, nondeleterious action as described before also have pK values of about 4.76 or less as disclosed in Lange's Handbook of Chemistry, 11th Edition (1973), Tables 5-7, 5-8. In other words their acid strength is equal to or greater than that of acetic acid.

Acids such as sulfuric acid and hydrochloric acid are generally preferred, however, because of their ready availability, relatively low cost, great acid strength, and efficacy in the process.

Specific examples of preferred pore preserving agents are a polysiloxane-polyoxyalkylene copolymer, a polyethoxylated sorbitol monolaurate, and a polyethoxylated t-octyl phenol.

The pore preserving agent can be incorporated in one of the ingredients used to make the silica hydrogel, however, it is preferably incorporated into the hydrogel after the washing step since this avoids loss of the agent during the washing step.

The hydrogel containing the pore preserving agent is then conventionally dried using an air oven, spray drying, tray drying, vacuum oven drying or drying under a heat lamp, for instance. Conventional drying temperatures of room temperature to 425° C. or higher can be used to thus remove free water and produce a xerogel. With spray drying the incoming air can be up to 425° C. although the catalyst does not get that hot.

The titanium compound is then incorporated under anhydrous conditions into the xerogel. This can be done by utilizing a nonaqueous solution of a titanium compound such as a titanium alkoxide, generally at an elevated temperature, to deposit the titanium compound. Alternatively, any desired titanium compound can simply be added to the xerogel during the first part of the activation (calcining) step in a fluidized bed. The titanation can also be separately effected at about 100° to about 200° C. in a fluidized bed, if desired.

Further with respect to the pore preserving agent, when the pore preserving agent is an oxygen-containing organic compound, the weight ratio of oxygen-containing organic compound to hydrogel employed in making the catalyst can range from about 5:1 to about 0.5:1.

When both an oxygen-containing organic compound and a normally liquid hydrocarbon are employed with the hydrogel, the weight ratio of hydrocarbon to organic compound can vary from about 20:1 to about 0.5:1.

When employing one or more surfactants with the hydrocarbon/oxygen-containing organic compound, generally about 0.1 to about 5 weight percent surfactant is used based on the weight of hydrocarbon/oxygen-containing organic compound.

When a surfactant or an organic silicon compound of said Ser. No. 914,258 is employed as the silica pore structure preserving agent, the weight ratio of hydrogel to surfactant or organic silicon compound can range from about 20:1 to about 500:1, preferably from about 40:1 to about 100:1.

Sufficient treating time is allotted to obtain contact of the various added components with the hydrogel or dried gel. Generally, times ranging from about 30 seconds to about 10 hours, preferably 15 minutes to 120 minutes are adequate. The treated hydrogel is then dried as described above to remove the liquids and the composite is then activated at an elevated temperature.

The activation can be carried out in a conventional manner by calcining at an elevated temperature, generally from about 400° C. to 1100° C. in a dry atmosphere containing oxygen, generally in air. The resulting catalyst contains at least a portion of the chromium in the hexavalent state. Alternatively, the catalyst can be activated in accordance with the reduction/reoxidation procedures disclosed in McDaniel and Welch, U.S. Pat. No. 4,151,122, which issued Apr. 24, 1979, the disclosure of which is hereby incorporated by reference. Use of this activation technique further enhances the capability to produce high melt index polymers exhibiting superior stress crack resistance.

Embodiment 2

In this embodiment, a silica is impregnated with an aqueous titanium-containing composition prepared as described hereinbelow from a titanium compound of the following structural formula:

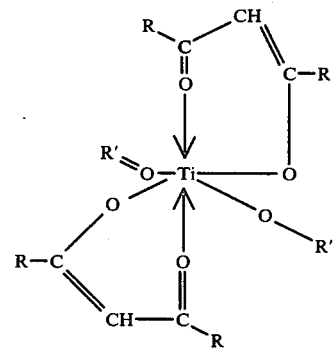

wherein the R and R' groups are the same or different and are selected from 1-7 carbon atom alkyl radicals. When all of the R groups are methyl and the R' is isopropyl the compound is diisopropoxy titanium acetylacetonate. The preferred titanium components are the acetylacetonates, i.e., where R is methyl most preferably those where R' is isopropyl or butyl.

If desired, a pore preserving agent as described in embodiment 1 can be used in the hydrogel to further enhance the beneficial qualities of the catalyst and such is preferred. That is, for instance, an alkali metal silicate can be added to an acid to precipitate a silica hydrogel which is then washed and impregnated with a water soluble chromium compound and thereafter dried in a conventional manner such as spray drying, tray drying, oven drying or drying with a heat lamp as described in embodiment 1. Thereafter, the thus formed xerogel is impregnated with the aqueous titanium composition. Alternatively the aqueous titanium composition can be combined with the hydrogel before drying, again either with or without a pore preserving agent in the hydrogel, after which the hydrogel is dried and activated as described in embodiment 1.

It is essential in accordance with Embodiment 2 that the titanium compound first be mixed with an anhydrous or at least essentially water free organic acid and thereafter diluted with water. The exact role of the organic acid is not known with certainty. It is not simply a matter of solubilizing the titanium compound (which is insoluble in water) since it does not work to dissolve the titanium component in other solvents such as acetone since a precipitate forms when such a mixture is diluted with water. By essentially water free organic acid is meant one having less than 5 percent water, preferably less than 1 percent. The volume ratio of essentially water free organic acid to titanium acetylacetonate must be greater than 0.5:1. Preferably it is from 1:1 to 10:1 more preferably about 2:1. The amount of acid can be greater than 10:1 if desired so far as operability is concerned, but generally a smaller amount is desired for practical reasons. The amount must be greater than 0.5:1, however, since the invention does not operate satisfactorily with only one part acid for two parts of the titanium compound. The acid can be added to the titanium component or vice versa.

After the organic acid and titanium compound have been mixed, the resulting titanium-containing composition is diluted with water to give the aqueous titanium-containing composition. Preferably, a ratio of water:-titanium-containing composition of about 7:3 is used although the ratio can be from about 1:1 to as much as 10:1 or greater. The water can be added to the composition or vice versa. When the aqueous titanium-containing composition is used to impregnate a xerogel, the thus-impregnated xerogel can then be directly activated as in embodiment 1 or the water removed by simple evaporation and the dry composite activated.

In all embodiments, the chromium component of the catalyst can be coprecipitated with the silica or added by means of an anhydrous solution of a chromium compound soluble in nonaqueous solvents such as hydrocarbons to the xerogel but preferably the chromium is introduced by means of incorporating an aqueous solution of a water soluble chromium compound with the hydrogel. This is preferably done after the hydrogel is washed with water to remove alkali metal ions. The water soluble chromium compound can be selected from among chromium acetate, chromic nitrate, chromic sulfate, chromous sulfate, chromium trioxide, ammonium chromate, and other soluble chromium compounds. Chromium acetate and $CrO_3$ are preferred.

The amount of chromium compound employed in making the catalyst is sufficient to provide from about 0.001 to about 10 weight percent, preferably 0.1 to 5 weight percent chromium based on the weight of the activated catalyst.

The amount of titanium compound employed in making the catalyst is sufficient to provide from about 0.1 to 10, preferably 1.5 to 5.5 weight percent titanium based on the weight of the activated catalyst.

The catalyst of this invention resembles coprecipitated silica-titanium catalyst in pore volume, in chromium content, and in the titanium content although the process for making the catalyst is substantially simplified and substantially less expensive.

The catalyst of this invention can be used to polymerize at least one mono-1-olefin containing 2 to 8 carbon atoms per molecule. The invention is of particular applicability in producing ethylene homopolymers and copolymers from mixtures of ethylene and one or more comonomer selected from 1-olefins containing 3 to 8 carbon atoms per molecule. Exemplary comonomers include aliphatic 1-olefins such as propylene, 1-butene, 1-hexene, and higher 1-olefins and conjugated or nonconjugated diolefins, such as 1,3-butadiene, isoprene, piperylene, 2,3-dimethyl-1,3-butadiene, 1,4-pentadiene, 1,7-hexadiene, and mixtures thereof. Ethylene copolymers preferably constitute at least about 90, more preferably 95 to 99 mole percent polymerized ethylene units. Ethylene, propylene, 1-butene, and 1-hexene are especially preferred.

The polymers can be prepared from the catalyst of this invention by solution polymerization, slurry polymerization, and gas phase polymerization technique using conventional equipment and contacting processes. However, the catalyst of this invention is particularly suitable in slurry polymerizations for the production of high melt index polymers in the absence of molecular weight modifiers, such as hydrogen. The slurry process is generally carried out in an inert diluent such as a paraffin, aromatic or cycloparaffin hydrocarbon. For predominantly ethylene polymers, a temperature of about 66° to 110° C. is employed. Hydrogen or other molecular weight modifiers can be used, of course, if desired. Also conventional cocatalysts and adjuvants and activators can be utilized, if desired.

EXAMPLES

Example I

This exemplifies embodiment 1 of the invention.

Hydrogel containing about 20 weight percent solids was prepared by introducing an alkali metal silicate into an acid. The hydrogel was admixed with sufficient aqueous chromium trioxide solution to provide 1 weight percent chromium based on the dry composite.

A series of catalysts was prepared from a conventionally spray dried composite formed by admixing a portion of a hydrogel with sufficient aqueous chromium (III) acetate solution to provide 1 weight percent chromium based on the dry composite and 2 volume percent based on the hydrogel of a liquid nonionic surfactant described as a polyethoxylated t-octylphenol, commercially available from Alcolac, Inc., Baltimore, Md. under the trademark Siponic F-300.

Individual portions of the spray dried composite were slurried in about 50 ml of dry n-hexane and a specified amount of n-hexane solution of titanium tetraisopropoxide containing 16 g titanium/100 ml solution was added and mixed with the slurry. The solvent was evaporated off by utilizing a hot plate and the product was converted into an active catalyst by heating it for 5 hours at 649° C. with dry air in a fluidized bed (Runs 1–6).

Individual portions of the spray dried composite containing a specified amount of titanium tetraisopropoxide added to a hexane slurry of the composite and dried as described earlier in this example were activated sequentially in a carbon monoxide atmosphere and an air atmosphere under fluid bed conditions. Each sample was fluidized in dry CO at 815° C. for 3 hours, the activator was flushed with nitrogen to remove the CO as the temperature was lowered to 705° C., and then fluidization with dry air at 705° C. was continued for 2 hours. The activated catalyst was recovered and stored as before pending the polymerization testing (Runs 7–12).

Other individual portions of the spray dried composite were fluidized in the activator with dry nitrogen at about 200° to 300° C. for 1 hour as a specified amount of titanium tetraisopropoxide was dripped into the fluidized bed. The titanium addition required about 10 minutes. The temperature was increased to about 550° C. in the nitrogen stream, the nitrogen was cut off and dry air substituted and the temperature raised to 650° C. over a 30 minute period and held at 650° C. for 5 hours. The activated catalysts were recovered and stored in a dry atmosphere until needed for polymerization testing (Runs 13-16).

A portion of each activated catalyst was used in ethylene particle form polymer by conducting the polymerization at 107° C. in the presence of 567 g of isobutane as diluent and ethylene at a nominal reactor pressure of 3.9 MPa for a time sufficient to produce about 3000 g polymer per g catalyst. Polymer was recovered and melt index was determined as described before. Each MI value was corrected to a common productivity level of 3000 g polymer per g catalyst so that a valid comparison of the values could be made. The catalyst weight and titanium level of each catalyst employed and the results obtained are given in Table IA, IB and IC. The calculated percent melt index improvement values are based on the melt index of the respective control run values.

pound composite can be accomplished either with a hydrocarbon solution of the titanium compound by impregnation or with neat addition of the titanium compound to the fluidized bed during the preliminary phase of the activation cycle given the catalyst. Active catalysts are formed which exhibit modest to markedly superior melt index capabilities compared to the control catalysts. When catalysts prepared according to the invention are sequentially activated in carbon monoxide and air, then their melt index capability is even more substantially improved, particularly when the titanium content of the catalysts range from about 2 to about 5 weight percent.

Example II

This exemplifies embodiment 2 of the invention.

A series of catalysts was prepared by admixing 12.7 g portions of a dry, commercially available silica-chromium oxide polymerization catalyst containing 1 weight percent chromium as the oxide with the components, when employed, described below. Each sample was dried overnight in a vacuum oven at 100° C., then activated in a fluidized bed with dry air at 760° C. for 5 hours. No pore preserving agents were used.

TABLE IA

Ethylene Polymerization, 107° C., 3.9 MPa
Titanium Compound Added By Nonaqueous Impregnation

| Run No. | Catalyst Wt. % Ti | Cat. Wt. g | Polymer Yield g | Productivity g polymer/g cat. | Melt Index | Percent Calculated Melt Index Improvement | HLMI MI | Remarks |
|---|---|---|---|---|---|---|---|---|
| 1 | 0 | 0.0590 | 179 | 3030 | 0.68 | —(a) | 75 | control |
| 2 | 1 | .0545 | 173 | 3170 | 1.9 | 180 | 55 | invention |
| 3 | 2 | .0525 | 165 | 3140 | 1.6 | 140 | 69 | invention |
| 4 | 3 | .0580 | 164 | 2830 | 1.2 | 76 | 69 | invention |
| 5 | 4 | .0630 | 210 | 3330 | 1.4 | 110 | 77 | invention |
| 6 | 5 | .0750 | 202 | 2690 | 1.9 | 180 | 79 | invention |

(a) A dash signifies no entry is needed.

TABLE IB

Ethylene Polymerization, 107° C., 3.9 MPa
Titanium Compound Added By Nonaqueous Impregnation
Catalyst Activated Sequentially in CO and Air

| Run No. | Catalyst Wt. % Ti | Cat. Wt. g | Polymer Yield g | Productivity g polymer/g cat. | Melt Index | Percent Calculated Melt Index Improvement | HLMI MI | Remarks |
|---|---|---|---|---|---|---|---|---|
| 7 | 0 | 0.0595 | 187 | 3140 | 0.81 | —(a) | 81 | control |
| 8 | 1 | .0690 | 212 | 3070 | 1.8 | 120 | 71 | invention |
| 9 | 2 | .0575 | 197 | 3430 | 5.7 | 600 | 52 | invention |
| 10 | 3 | .0500 | 176 | 3520 | 5.1 | 530 | 46 | invention |
| 11 | 4 | .0460 | 157 | 3410 | 5.5 | 580 | 53 | invention |
| 12 | 5 | .0535 | 142 | 2650 | 11 | 1260 | 45 | invention |

(a) A dash signifies no entry is needed.

TABLE IC

Ethylene Polymerization, 107° C., 3.9 MPa
Titanium Compound Added During Catalyst Activation

| Run No. | Catalyst Wt. % Ti | Cat. Wt. g | Polymer Yield g | Productivity g polymer/g cat. | Melt Index | Percent Calculated Melt Index Improvement | HLMI MI | Remarks |
|---|---|---|---|---|---|---|---|---|
| 13 | 0 | 0.0815 | 230 | 2820 | 0.25 | —(a) | 88 | control |
| 14 | 1 | .0490 | 148 | 3020 | .27 | 8 | 74 | invention |
| 15 | 3 | .0445 | 148 | 3330 | .71 | 184 | 73 | invention |
| 16 | 5 | .0460 | 105 | 2280 | .86 | 244 | 63 | invention |

(a) A dash signifies no entry is needed.

Inspection of the results given in Tables IA, IB, IC shows that titanation of the dry silica-chromium com- Catalyst 1, control; no titanium compound added.

Catalyst 2, invention; dry control catalyst was admixed with 38.1 ml of a solution formed by dissolving 10 ml (9.9 g) diisopropoxy titanium acetylacetonate [Ti(ACAc)$_2$] in 20 ml (21 g) of glacial acetic acid (HAc) and then diluting with 70 ml of water. The water to HAc volume ratio was then about 3.5 to 1. The amount of titanium compound added was sufficient to provide 3 weight percent titanium based on the dry composite.

Catalyst 3, invention; dry control catalyst was admixed with 19 ml of a solution formed by dissolving 10 ml of Ti(AcAc)$_2$ in 20 ml of HAc and then diluting with 20 ml of water. The water to HAc volume ratio was then 1 to 1. The amount of titanium compound was sufficient to provide 3 weight percent titanium based on the dry composite.

Catalyst 4, invention; duplicate of catalyst 3 to indicate reproducibility of the catalyst forming method.

Catalyst 5, control; dry catalyst was admixed with 38.1 ml of a solution formed by dissolving 10 ml of Ti(ACAc)$_2$ in 20 ml (16 g) of methyl ethyl ketone (MEK) and then diluting with 70 ml of water. The water to MEK volume ratio was then about 3.5 to 1. The amount of titanium compound added was sufficient to provide 3 weight percent titanium based on the dry composite.

Samples of the activated catalysts were employed in ethylene polymerization exactly as described in the first example. The catalyst weights used and the results obtained are given in Table II. Calculated percent melt index improvement is based on the melt index obtained in control run 1.

TABLE II

| | | | | | Percent Calculated | | |
|---|---|---|---|---|---|---|---|
| Run No. | Catalyst Wt. g | Wt. % Ti | Polymer Yield g | Productivity g polymer/g cat. | Melt Index | Melt Index Improvement | HLMI MI | Remarks |
| 1 | 0.0450 | 0 | 216 | 4800 | 0.35 | —(a) | 84 | control |
| 2 | .0456 | 3 | 229 | 5020 | 0.40 | 14 | 81 | invention(b) |
| 3 | .0408 | 3 | 203 | 4980 | 0.70 | 100 | 68 | invention(b) |
| 4 | .0477 | 3 | 260 | 5450 | 0.63 | 80 | 86 | invention(b) |
| 5 | .0477 | 3 | 231 | 4860 | 0.34 | none | 95 | control(c) |

Ethylene Polymerization, 107° C., 3.9 MPa
Aqueous Titanation of Dry Catalyst (a)A dash signifies no entry is nedded.
(b)Glacial acetic acid and water solution used with titanium compound.
(c)Methyl ethyl ketone and water solution used with titanium compound.

The results in Table II show that a dry silica-chromium oxide catalyst can be successfully aqueously titanated with a solution consisting of diisopropoxy titanium acetylacetonate dissolved in a glacial acetic acid water mixture. Catalysts recovered and activated produce ethylene polymers having melt index values ranging from 14 to 100 percent better (runs 2–4) than the untitanated control catalyst of run 1. When methyl ethyl ketone is substituted for acetic acid in preparing the catalyst the melt index results in control run 5 demonstrate no improvement in melt index capability over the control catalyst of run 1.

It is believed similar good results would be obtained by incorporating the aqueous titanium composition in the hydrogel and such would be preferred for economic reasons.

While this invention has been described in detail for the purpose of illustration, it is not to be construed as limited thereby but is intended to cover all changes and modifications within the spirit and scope thereof.

I claim:

1. A process for producing a chromium-containing catalyst comprising forming a silica hydrogel containing a pore preserving agent selected from (1) organic silicon compounds having the structure R$_n$SiA$_{4-n}$ wherein n is an integer of 2 or 3, and wherein each R is a saturated or unsaturated hydrocarbon group wherein each R can be the same or different and wherein A is selected from the group consisting of hydroxy radicals, halides and alkoxy radicals in which the alkyl group therein contains from 1 to about 10 carbon atoms, (2) water soluble inorganic acids which are sufficiently ionized to produce a pH of 0 to 3.5, (3) organic acids having an acid strength equal to or greater than that of acetic acid, and (4) anionic, cationic or non-ionic surfactants; drying said hydrogel by means of air oven drying, spray drying, tray drying, vacuum oven drying or drying under a heat lamp to form a xerogel; and anhydrously incorporating a titanium compound into said xerogel, and wherein said chromium is introduced by either coprecipitating same with said silica hydrogel, by combining an aqueous solution of a water-soluble chromium compound with said hydrogel, or adding anhydrous solution of a chromium compound soluble in non-aqueous solvents to said xerogel.

2. A process according to claim 1 wherein said chromium in the form of a compound soluble in nonaqueous solvents is anhydrously impregnated onto said xerogel.

3. A method according to claim 1 wherein said hydrogel is washed and after said washing said pore preserving agent is admixed therewith.

4. A method according to claim 3 wherein said chromium is added as an aqueous solution of a water soluble chromium compound to said hydrogel.

5. A method according to claim 4 wherein said chromium is incorporated in the form of a compound selected from CrO$_3$ and chromium acetate.

6. A method according to claim 3 wherein said chromium-containing catalyst contains from about 0.5 to about 4 weight percent chromium and from 1.5 to 5.5 weight percent titanium based on the total weight of the final dried catalyst.

7. A method according to claim 3 wherein said titanium is incorporated by impregnating said xerogel with a nonaqueous solution of a titanium compound.

8. A method according to claim 7 wherein said titanium compound is added in a hydrocarbon solution.

9. A method according to claim 8 wherein said titanium compound is titanium tetraisopropoxide.

10. A method according to claim 3 wherein said titanium compound is added neat to said xerogel during a subsequent activation process.

11. A method according to claim 1 wherein said pore preserving agent is selected from a polysiloxane-polyoxyalkylene copolymer, a polyethoxylated sorbitol monolaurate, and a polyethoxylated t-octylphenol.

12. A method according to claim 3 wherein said hydrogel is spray dried.

13. A method according to claim 12 wherein said pore preserving agent is selected from a polysiloxane-polyoxyalkylene copolymer, a polyethoxylated sorbitol monolaurate, and a polyethoxylated t-octylphenol, said titanium compound is titanium tetraisopropoxide and wherein said titanium compound is added from a hydrocarbon solution.

14. A method according to claim 1 wherein said xerogel is activated by reduction and reoxidation.

15. A catalyst produced by the method of claim 14.

16. A catalyst produced by the method of claim 1.

17. A process for producing a chromium-containing catalyst comprising forming a silica hydrogel and thereafter removing water to form a xerogel, said silica in either the hydrogel stage or the xerogel stage being impregnated with an aqueous titanium-containing composition formed by mixing an essentially water-free organic acid and a titanium compound of the formula

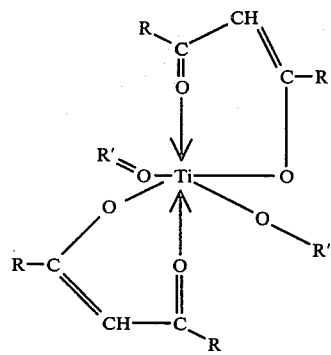

wherein the R and R' groups are the same or different and are selected from 1-7 carbon atom alkyl radicals to give a titanium-containing composition and thereafter diluting said titanium-containing composition with water to give said aqueous titanium-containing composition, and wherein said chromium is introduced by either coprecipitating same with said silica hydrogel, by combining an aqueous solution of a water-soluble chromium compound with said hydrogel, or adding an anhydrous solution of a chromium compound soluble in a non-aqueous solvent to said xerogel.

18. A method according to claim 17 wherein said organic acid and said titanium compound are mixed in a ratio within the range of 1:1 to 10:1 of acid:titanium compound to form said titanium-containing composition.

19. A method according to claim 18 wherein said titanium-containing composition is diluted with said water in a ratio within the range of 1:1 to 10:1 water:-titanium-containing composition to give said aqueous titanium-containing composition.

20. A method according to claim 17 wherein said aqueous titanium containing-containing composition is added to said silica at the hydrogel stage.

21. A method according to claim 17 wherein said aqueous titanium-containing composition is added to said silica in the xerogel stage and thereafter the thus titanium impregnated xerogel is dried.

22. A method according to claim 21 wherein said silica is formed from a hydrogel also containing a pore preserving agent selected from organic silicon compounds, oxygen-containing organic compounds, acids and surfactants.

23. A method according to claim 17 wherein said R groups are methyl.

24. A method according to claim 17 wherein said silica is made by adding an alkali metal silicate to an acid to form a hydrogel, washing the hydrogel with water, impregnating the thus washed hydrogel with an aqueous solution of a chromium compound selected from $CrO_3$ and chromium acetate and spray drying, said aqueous titanium-containing composition being added to the washed hydrogel.

25. A method according to claim 24 wherein said chromium-containing catalyst contains from about 0.5 to about 4 weight percent chromium and 1.5 to 5.5 weight percent titanium based on the total weight of the final dried catalyst and wherein the titanium compound is diisopropoxy titanium acetylacetonate and wherein said essentially water free organic acid is glacial acetic acid.

26. A method according to claim 25 wherein said thus impregnated silica is activated by reduction and reoxidation.

27. A catalyst produced by the method of claim 26.

28. A catalyst produced by the method of claim 17.

* * * * *

UNITED STATES PATENT AND TRADEMARK OFFICE
CERTIFICATE OF CORRECTION

PATENT NO.   :   4,294,724
DATED        :   October 13, 1981
INVENTOR(S)  :   Max P. McDaniel It is certified that error appears in the above—identified patent and that said Letters Patent is hereby corrected as shown below:

Column 4, in the formula, lines 36 and 37, "$R'\!\!\searrow_{O-Ti}\!\!-O$" should be --- $R'\!\!\searrow_{O-Ti}\;\;O$ ---.

Column 11, in the formula, lines 30 and 31, "$R'\!\!\searrow_{O-Ti}\!\!-O$" should be --- $R'\!\!\searrow_{O-Ti}\!\!-O$ ---.

Column 12, line 20, "21" should be --- 17 ---.

Signed and Sealed this

Twenty-sixth Day of January 1982

[SEAL]

Attest:

GERALD J. MOSSINGHOFF

Attesting Officer    Commissioner of Patents and Trademarks